United States Patent
Hatfield et al.

(10) Patent No.: US 12,085,723 B2
(45) Date of Patent: Sep. 10, 2024

(54) ELECTRONIC GLASSES WITH DYNAMICALLY EXTENDABLE AND RETRACTABLE TEMPLES

(71) Applicant: Lenovo (Singapore) Pte. Ltd., Singapore (SG)

(72) Inventors: Nathan Hatfield, Raleigh, NC (US); Daniel Pollack, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 549 days.

(21) Appl. No.: 17/392,591

(22) Filed: Aug. 3, 2021

(65) Prior Publication Data
US 2023/0044153 A1 Feb. 9, 2023

(51) Int. Cl.
*G02B 27/01* (2006.01)
*G02C 1/04* (2006.01)

(52) U.S. Cl.
CPC ..... *G02B 27/0176* (2013.01); *G02B 27/0172* (2013.01); *G02C 1/04* (2013.01); *G02B 2027/0178* (2013.01)

(58) Field of Classification Search
CPC .... G02C 5/229; G02C 5/2272; G02C 5/2209; G02C 5/04; G02C 5/20; G02C 5/146; G02C 5/14; G02C 1/04; G02C 2200/06; G02B 2027/0154; G02B 2027/0178; G02B 27/0176; G02B 27/0172
USPC .................................. 351/158, 111, 118, 117
See application file for complete search history.

(56) References Cited

U.S. PATENT DOCUMENTS

| | | | |
|---|---|---|---|
| 3,588,237 A | 6/1971 | Aldrich | |
| 5,713,804 A | 2/1998 | Socci et al. | |
| 5,815,126 A | 9/1998 | Fan et al. | |
| 7,959,287 B1 * | 6/2011 | Saffra | G02C 13/003 351/227 |
| 8,134,593 B2 | 3/2012 | Otsuki et al. | |
| 8,135,440 B2 | 3/2012 | Hong et al. | |
| 8,223,024 B1 | 7/2012 | Petrou | |
| 8,411,907 B2 | 4/2013 | Nelson et al. | |
| 8,953,027 B2 | 2/2015 | Horiuchi et al. | |
| 8,958,158 B1 | 2/2015 | Raffle et al. | |

(Continued)

FOREIGN PATENT DOCUMENTS

CN 111474738 A * 7/2020 ............... G02C 5/16

OTHER PUBLICATIONS

English machine translation of CN111474738A (Year: 2024).*

*Primary Examiner* — Travis S Fissel
(74) *Attorney, Agent, or Firm* — John M. Rogitz; John L. Rogitz

(57) ABSTRACT

In one aspect, a headset may include a bridge with lenses, an elongated left temple coupled to a left portion of the bridge, and an elongated right temple coupled to a right portion of the bridge. The headset may also include at least one adjustable mechanism that is manipulable to dynamically arrange the structure of the temples toward and away from the bridge, as well as a locking mechanism that selectively locks and unlocks the arrangement of the temples with respect to the bridge. In some examples, the adjustable mechanism may include at least one track for sliding the left and right temples with respect to the bridge to extend and retract distal portions of the temples from the bridge, and at least one element such as a wheel that is controllable to move the temples with respect to the bridge along the at least one track.

20 Claims, 12 Drawing Sheets

(56) References Cited

U.S. PATENT DOCUMENTS

| | | |
|---|---|---|
| 9,128,283 B1 | 9/2015 | Heinrich et al. |
| 9,250,442 B2 | 2/2016 | Cho et al. |
| 9,365,387 B2 | 6/2016 | Beers et al. |
| 9,417,452 B2 | 8/2016 | Schowengerdt et al. |
| 9,696,404 B1 | 7/2017 | Doyle et al. |
| 10,085,517 B2 | 10/2018 | Beers et al. |
| 10,359,806 B2 | 7/2019 | Osman |
| 10,845,845 B2 | 11/2020 | Osman |
| 2003/0038919 A1 | 2/2003 | Lin |
| 2004/0104864 A1 | 6/2004 | Nakada |
| 2008/0136916 A1 | 6/2008 | Wolff |
| 2008/0278678 A1 | 11/2008 | Howell et al. |
| 2011/0194732 A1 | 8/2011 | Tsuj |
| 2011/0288659 A1 | 11/2011 | Nelson et al. |
| 2011/0304464 A1 | 12/2011 | Nelson et al. |
| 2011/0305375 A1 | 12/2011 | Nelson et al. |
| 2011/0316881 A1 | 12/2011 | Yoshifuji et al. |
| 2011/0316987 A1 | 12/2011 | Komoriya et al. |
| 2012/0194418 A1* | 8/2012 | Osterhout .......... G02B 27/0149 345/156 |
| 2013/0007307 A1 | 1/2013 | Kang et al. |
| 2013/0231941 A1 | 9/2013 | Pham et al. |
| 2013/0258070 A1 | 10/2013 | Corriveau et al. |
| 2013/0278631 A1 | 10/2013 | Border et al. |
| 2013/0289748 A1 | 10/2013 | Nelson et al. |
| 2014/0240544 A1 | 8/2014 | Kim et al. |
| 2014/0341441 A1 | 11/2014 | Slaby et al. |
| 2014/0375542 A1 | 12/2014 | Robbins et al. |
| 2015/0103306 A1 | 4/2015 | Kaji et al. |
| 2015/0279102 A1 | 10/2015 | Fleck et al. |
| 2016/0054570 A1 | 2/2016 | Bosveld et al. |
| 2016/0140332 A1 | 5/2016 | Pfursich et al. |
| 2016/0184703 A1 | 6/2016 | Brav et al. |
| 2016/0216760 A1 | 7/2016 | Trutna et al. |
| 2016/0259986 A1 | 9/2016 | Yun et al. |
| 2016/0361512 A1 | 12/2016 | Lawrenson |
| 2017/0026577 A1 | 1/2017 | You et al. |
| 2017/0045928 A1 | 2/2017 | Ishikawa et al. |
| 2017/0102767 A1 | 4/2017 | Kim et al. |
| 2017/0168323 A1 | 6/2017 | Gardner |
| 2017/0249041 A1 | 8/2017 | Moller et al. |
| 2017/0261388 A1 | 9/2017 | Ma et al. |
| 2017/0280223 A1 | 9/2017 | Cavarra et al. |
| 2017/0326462 A1 | 11/2017 | Lyons et al. |
| 2018/0005386 A1 | 1/2018 | Thangappan et al. |
| 2018/0010902 A1 | 1/2018 | Gong |
| 2018/0088340 A1 | 3/2018 | Amayeh et al. |
| 2018/0096503 A1 | 4/2018 | Kaehler et al. |
| 2018/0210208 A1* | 7/2018 | Zhou .................. G02B 27/1026 |

* cited by examiner

ELECTRONIC GLASSES WITH DYNAMICALLY EXTENDABLE AND RETRACTABLE TEMPLES

FIELD

The disclosure below relates to technically inventive, non-routine solutions that are rooted in computer technology and that produce concrete technical improvements. In particular, the disclosure below relates to electronic glasses with dynamically extendable and retractable temples.

BACKGROUND

The present disclosure recognizes that the width of different users' heads and the positioning of their ears can vary greatly. As also recognized herein, this can result in uncomfortable fits for some people when wearing standardized electronic eyewear, and this discomfort can be amplified by the increased weight of various electronic components that might be included in the electronic eyewear. There are currently no adequate solutions to the foregoing technological problem.

SUMMARY

Accordingly, in one aspect a headset includes a bridge with one or more lenses, an elongated left temple coupled to a left portion of the bridge, and an elongated right temple coupled to a right portion of the bridge. At least part of the headset may also include at least one adjustable mechanism that is manipulable to dynamically arrange the structure of the left and right temples toward and away from the bridge, and a locking mechanism that selectively locks and unlocks the arrangement of the left and right temples with respect to the bridge.

Thus, in some examples the headset may include a left adjustable mechanism that is manipulable to dynamically arrange the structure of the left temple toward and away from the left portion of the bridge, and a left locking mechanism that selectively locks and unlocks the arrangement of the left temple with respect to the left portion of the bridge. In these examples, the headset may also include a right adjustable mechanism that is manipulable to dynamically arrange the structure of the right temple toward and away from the right portion of the bridge, and a right locking mechanism that selectively locks and unlocks the arrangement of the right temple with respect to the right portion of the bridge.

Also in some example implementations, the headset may include a housing and the at least one adjustable mechanism may include at least one adjustable core structure that is nested within the housing. The at least one adjustable mechanism may also include at least one slider and/or wheel to extend and retract at least part of the left and right temples with respect to the bridge using the at least one core structure. The slider or wheel may be located on the bridge and/or on at least one of the temples.

Also in some examples, the headset may include at least one processor and storage accessible to the at least one processor. The one or more lenses may include one or more electronic displays.

In another aspect, a method includes providing a bridge for a headset, with the bridge including one or more lenses. The method also includes providing a first arm coupled to a first portion of the bridge and providing a second arm coupled to a second portion of the bridge. The method further includes providing at least one adjustable mechanism that is manipulable to dynamically extend and retract distal portions of the first and second arms from the bridge.

Additionally, if desired the method may include providing a locking mechanism that selectively locks and unlocks the positioning of the distal portions of the first and second arms with respect to the bridge. Also if desired, the at least one adjustable mechanism may include at least one adjustable inner structure and at least one element that is manipulable to dynamically extend and retract the distal portions with respect to the bridge using the inner structure. The at least one element may be located on the bridge.

In still another aspect, an assembly includes a bridge with one or more electronic lenses, a first arm coupled to a first portion of the bridge, and a second arm coupled to a second portion of the bridge. The assembly also includes at least one mechanism that is controllable to extend and retract distal portions of the first and second arms from the bridge. The at least one mechanism includes at least one track for sliding the first and second arms with respect to the bridge to extend and retract the distal portions from the bridge, and also includes at least one element that is controllable to move the first and second arms with respect to the bridge along the at least one track.

In some examples, the assembly may also include at least one lock to lock the first and second arms at particular locations with respect to the bridge.

Additionally, in some example implementations the assembly may include a first mechanism that is controllable to extend and retract the distal portion of the first arm from the first portion of the bridge. The first mechanism may include a first track for sliding the first arm with respect to the bridge to extend and retract the distal portion of the first arm from the first portion of the bridge and may include a first element that is controllable to move the first arm with respect to the bridge along the first track. In these example implementations, the assembly may also include a second mechanism that is controllable to extend and retract the distal portion of the second arm from the second portion of the bridge. The second mechanism may include a second track for sliding the second arm with respect to the bridge to extend and retract the distal portion of the second arm from the second portion of the bridge and may include a second element that is controllable to move the second arm with respect to the bridge along the second track. If desired, in certain particular implementations the assembly may further include a first lock to lock the first arm at a particular preset location with respect to the bridge and a second lock to lock the second arm at a particular preset location with respect to the bridge.

In various examples, the assembly may be established by electronic glasses. Also in various examples, the at least one element may be controllable to move the first and second arms along the at least one track in preset increments. Additionally, the at least one mechanism may be controllable to extend and retract distal portions of the first and second arms obliquely away from a surface of the bridge from which the first and second arms extend.

The details of present principles, both as to their structure and operation, can best be understood in reference to the accompanying drawings, in which like reference numerals refer to like parts, and in which:

DETAILED DESCRIPTION

Figure 1:
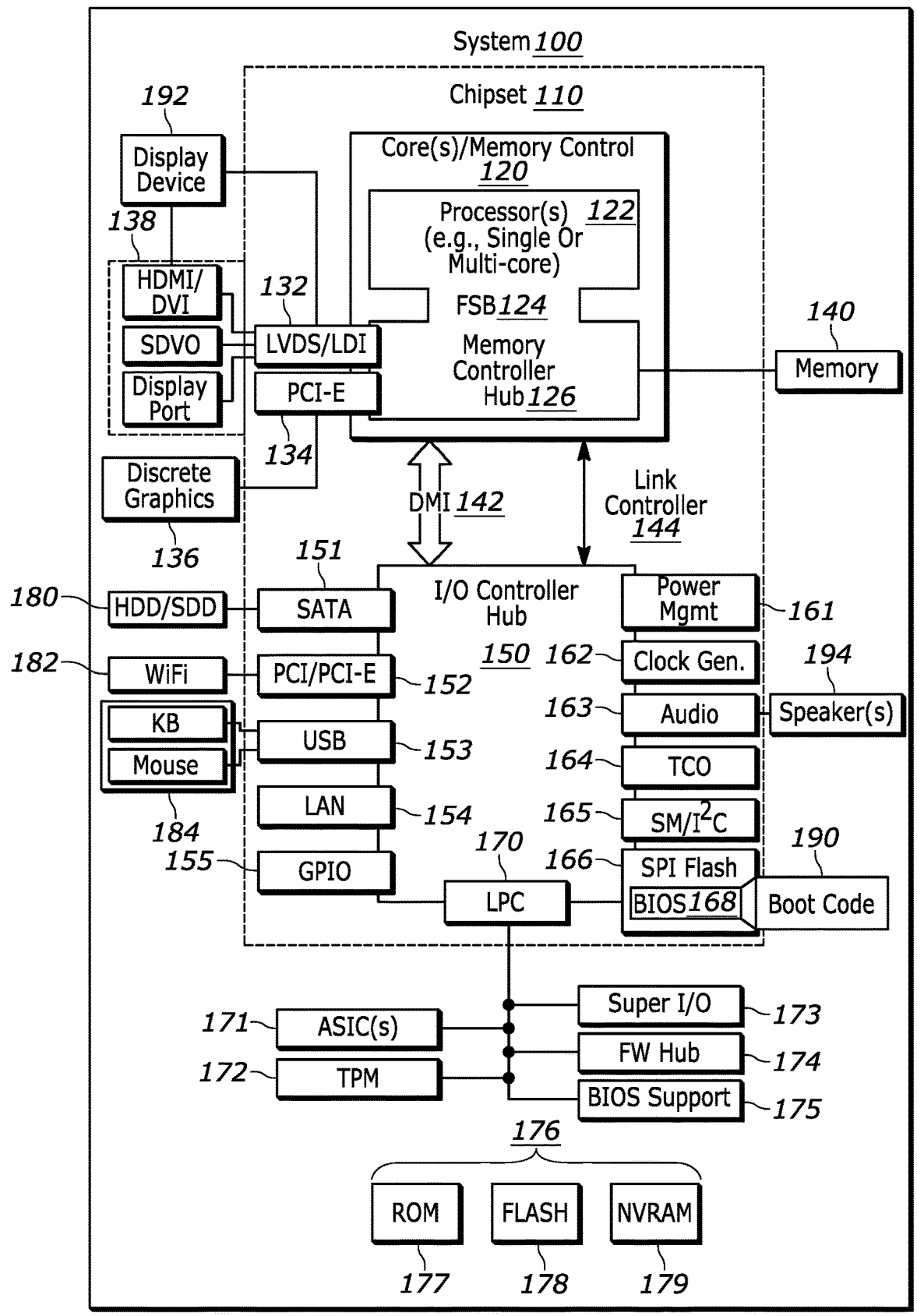
FIG. 1 is a block diagram of an example system consistent with present principles.

Among other things, the detailed description below discloses a headset that may account for the variability in head dimensions among different people by using an adjustable core structure that is nested within the main chassis of the headset, a slider-type mechanism to increase or decrease the length of the core structure from the main chassis, and a locking mechanism to fix the length of the core structure.

Thus, the core structure may be extended to create a more aggressive stop point between the temple and the chassis to exact additional pressure along the inside of the temple surface when extended or relieve pressure along the inside of the temple surface when retracted. The slider mechanism may therefore allow the user to customize the length of the core structure until an appropriate amount of force is distributed along the inside of the temples. As the length of the core structure is increased, the temple stop point may become more acute (move in a direction toward the bridge), thus propagating more force along the inside of the temple wall that makes contact with the head. Conversely, as the length of the core structure is decreased, the temple stop point may move farther from the bridge along the temples. The slider mechanism may even use preset length increments to ensure the user can match the core structure length for both the left and right sides. The locking mechanism may then fix the length of the core structure such that the length does not change as the temple presses against the core structure when splayed outwards with the lock locked.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
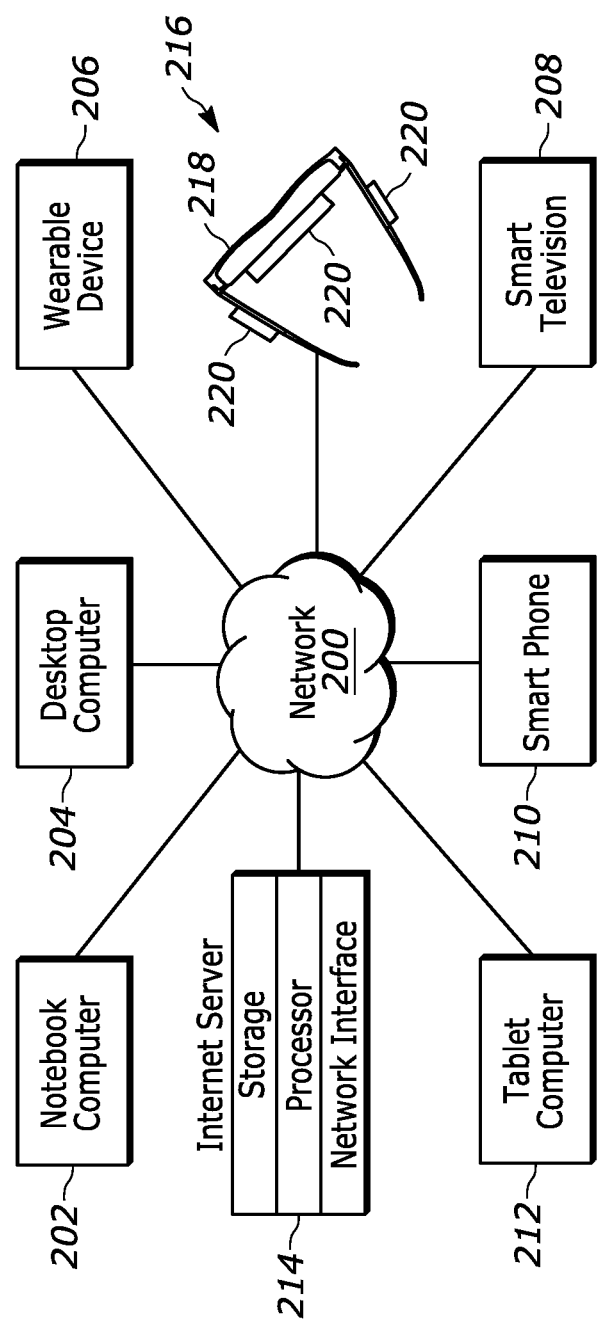
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset/head-mounted display (HMD) 216, and a server 214 such as an Internet server that may provide cloud storage accessible to the devices 202-212, 216. It is to be understood that the devices 202-216 may be configured to communicate with each other over the network 200.

Describing the headset 216 in more detail, as shown it may include left and right lenses 218 that themselves may include one or more transparent "heads up" electronic displays integrated into the lenses 218 to present content (possibly stereoscopically) consistent with present principles. The headset 216 may also include pressure sensors 220 located at various portions of the housing of the headset 216 and that contact the wearer's head when the headset 216 is worn in order to sense pressure on the user's head exerted by the headset 216. For instance, one or more pressure sensors 220 may be located on an inner, vertical, user-facing surface of the headset's bridge above the nose position. One or more pressure sensors 220 may also be located on an inner, vertical, user-facing surface of each of the headset's temples/arms. The pressure sensors may for example be, without limitation, piezoelectric pressure sensors, capacitive pressure sensors, piezoresistive strain gauges, optical pressure sensors, electromagnetic pressure sensors, etc.

Additionally, as indicated above the headset 216 may include some or all of the components of the system 100, and so the pressure sensors 220 may provide their sensor data as input to at least one processor on the headset 216 for processing consistent with present principles. The headset 216 may also include other elements not shown in FIG. 2 for simplicity, such as RAM and persistent storage that may both be accessible to the at least one processor on the headset 216. The headset 216 may also include one or more forward-facing cameras such as one mounted on the bridge above the nose section so that the camera may have an outward-facing field of view similar to that of an end user while wearing the headset 216. Cameras may be located at other headset locations as well. Further note that in some examples, inward-facing cameras may also be mounted within the headset 216 and oriented to image the user's eyes for eye tracking while the user wears the headset 216. The headset 216 may further include a network interface (e.g., Wi-Fi, cellular, and/or Bluetooth transceiver) for communicating with other devices, and a rechargeable battery for powering components of the headset 216 such as the pressure sensors 220, processor(s), etc.

Additionally, note that while the headset 216 is illustrated as computerized smart glasses, in other examples the headset may be an augmented reality (AR) headset, mixed reality (MR) headset, virtual reality (VR) headset, or other type of headset/head-mounted display (HMD). For example, the headset may be a head-circumscribing VR headset with non-transparent displays but that still present a real-time video feed from the headset's front-facing camera for AR viewing of the real world along with virtual VR objects and other digital objects presented by the headset.

Figure 3:
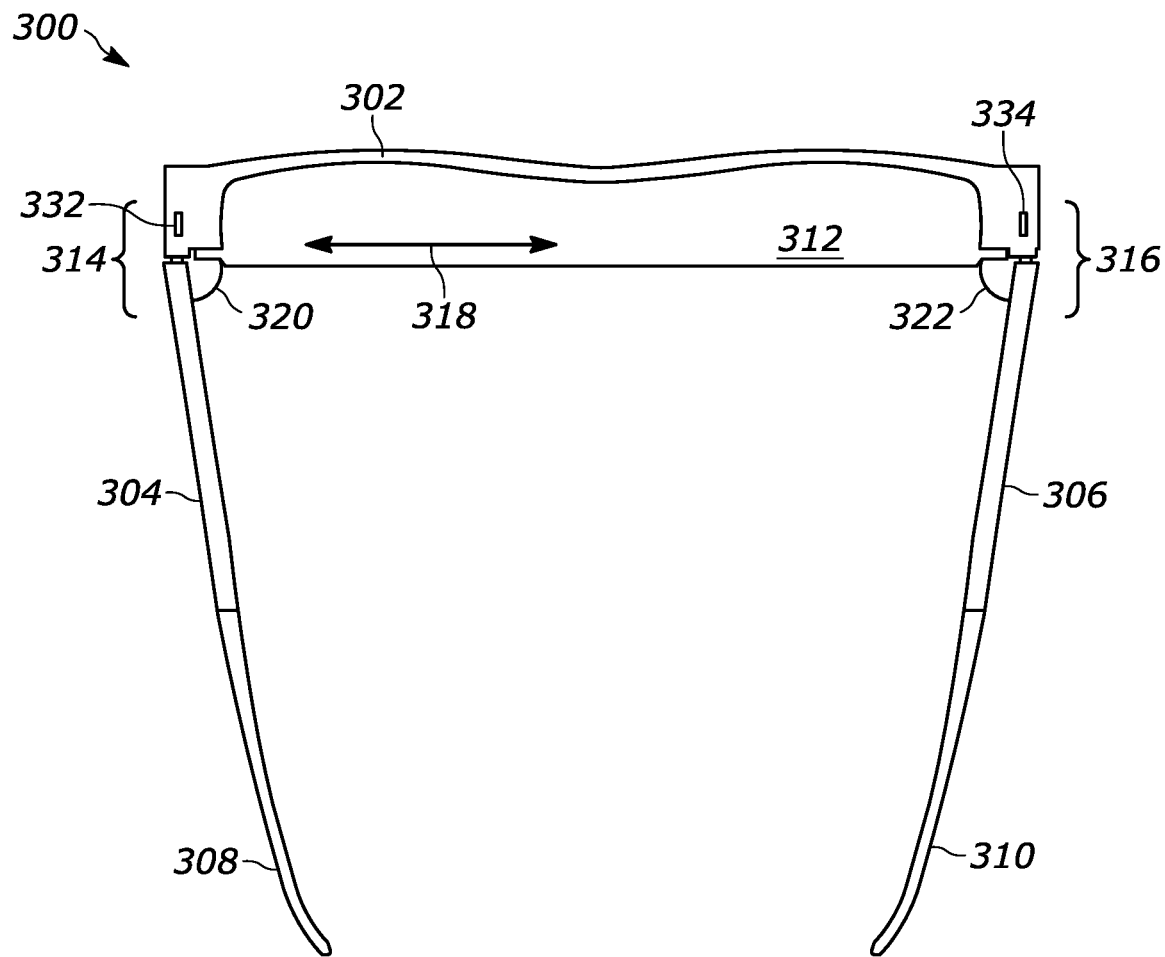
FIGS. 3-5 show top plan views of an example headset consistent with present principles.
Figure 4:
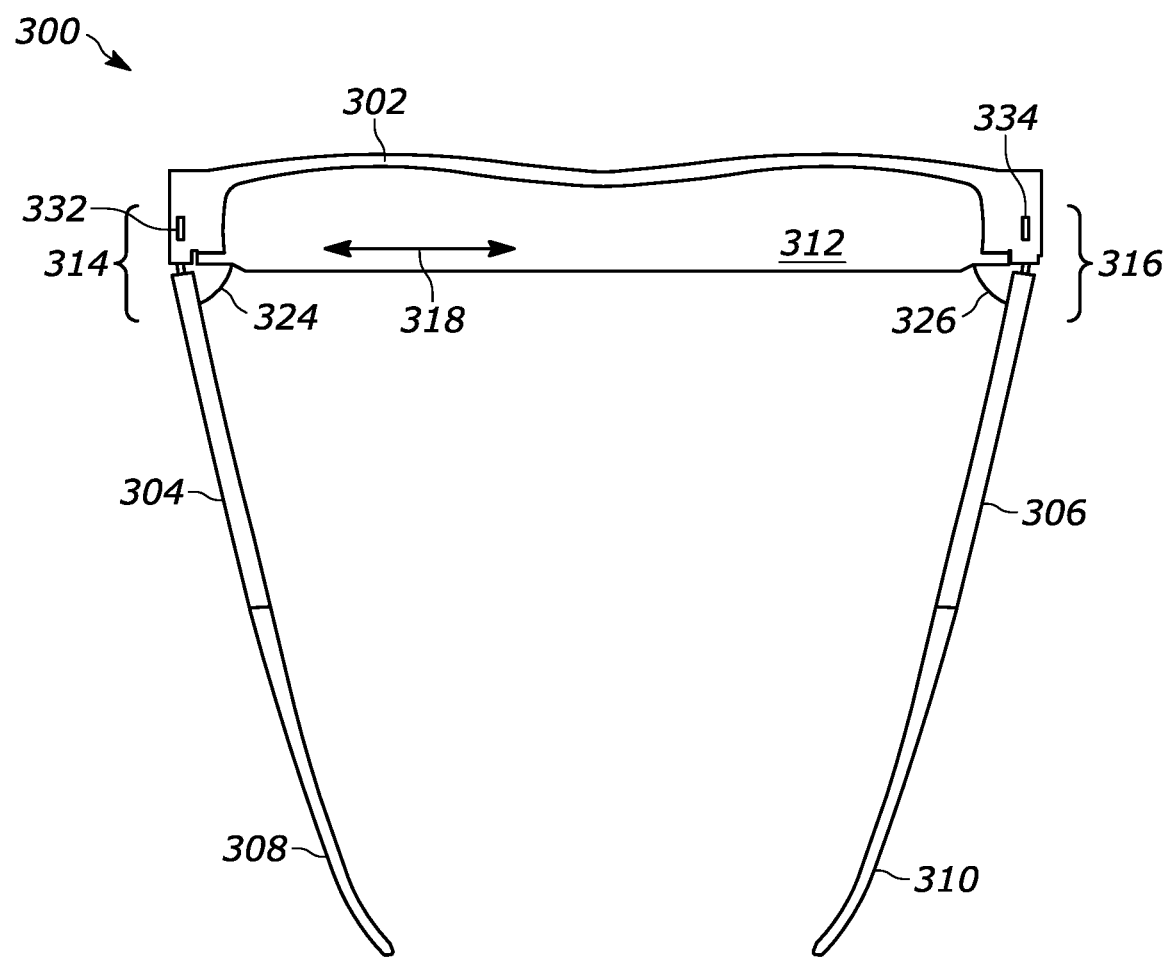
Figure 5:
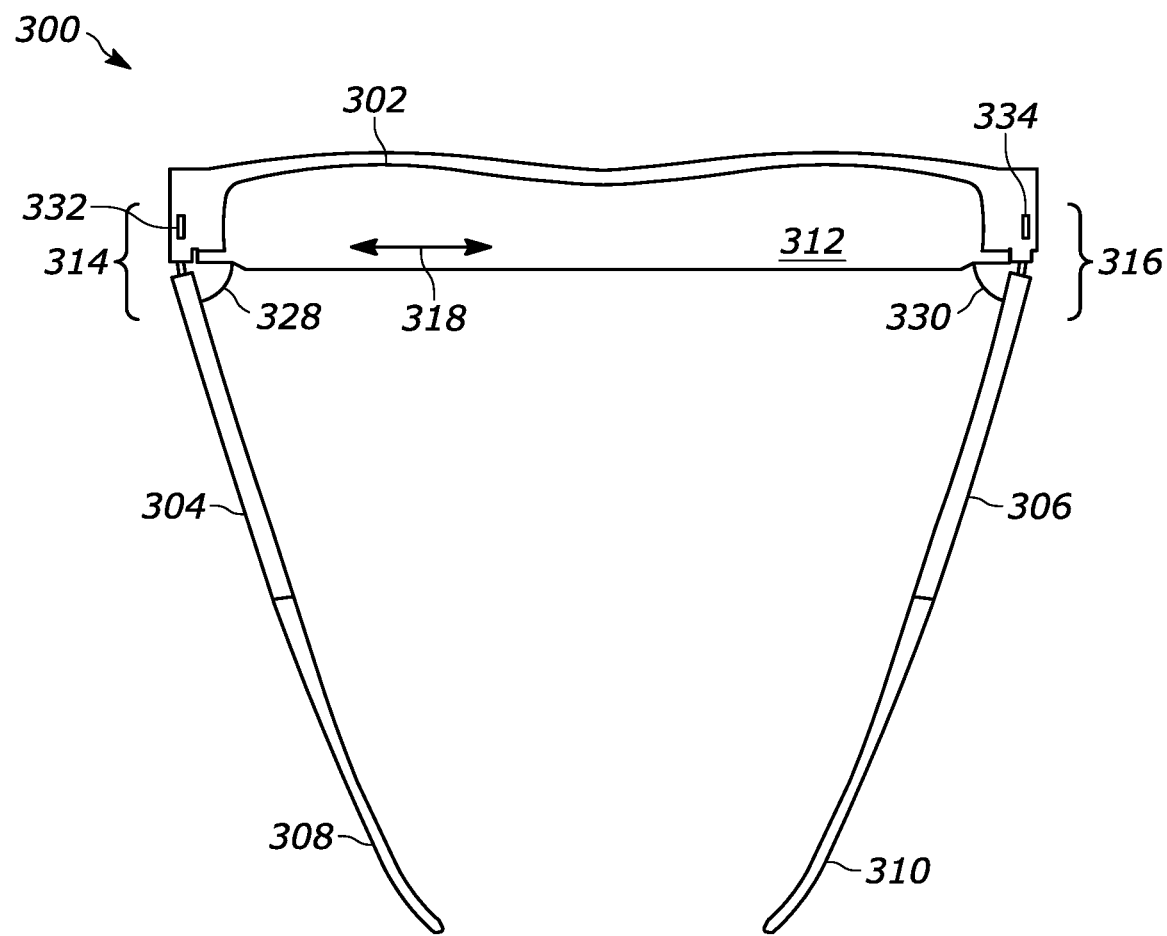

FIGS. 3-8 show an example embodiment of a headset 300 consistent with present principles, with the headset 300 being similar to the headset 216 described above. As shown in the top plan views of FIGS. 3-5, the headset 300 may include a bridge 302, a left arm/temple 304, and a right arm/temple 306. In some examples, the left and right temples 304, 306 may each be elongated, unitary arms that extend from the bridge 302 over respective left and right ears and then slightly down behind the user's ears at respective distal portions 308, 310 that themselves include and terminate at respective distal ends. As also shown in FIGS. 3-5, the headset 300 may include one or more lenses 312 with integrated electronic displays coupled to the bridge 302 via frames or other coupling methods.

It may be further appreciated from FIGS. 3-5 that the elongated left temple 304 is coupled to a left side of the bridge 302 and the elongated right temple 306 is coupled to a right side of the bridge 302 via respective left and right dynamically-adjustable mechanisms 314, 316. The mechanisms 314, 316 may establish hinges between the bridge 302 and temples 304, 306. The mechanisms 314, 316 may be manipulable to dynamically arrange the structure of the left and right temples 304, 306 toward and away from the bridge 302 relative to the position of the user's ears. Thus, the dynamically-adjustable mechanisms 314, 316 may be controllable to extend and retract at least the distal portions 308, 310 obliquely from the bridge 302 as shown (or orthogonally in other examples) relative to both the longer X axis 318 and shorter Y axis (not shown) of the vertically-oriented plane(s) of the bridge/lens combination.

Accordingly, FIGS. 3-5 show an example in which the mechanisms 314, 316 are controlled to orient the left and right temples 304, 306 obliquely as just described. As shown in FIG. 3, the mechanisms 314, 316 have been configured to arrange the distal portions 308, 310 closer to the bridge 302 in a more retracted setting, establishing equal first and second oblique angles 320, 322.

Then as shown in FIG. 4, the mechanisms 314, 316 have now been configured to arrange the distal portions 308, 310 farther from the bridge 302 than in FIG. 3 in a more extended setting, establishing equal third and fourth oblique angles 324, 326 that are less than the first and second oblique angles 320, 322. Then as may be appreciated from FIG. 5, the mechanisms 314, 316 may be configured to arrange the distal portions 308, 310 even farther from the bridge 302 than in FIG. 4 in an even more extended setting, establishing equal fifth and sixth oblique angles 328, 330 that are less than the third and fourth oblique angles 324, 326.

Accordingly, it may be appreciated that the mechanisms 314, 316 may allow the end-user of the headset 300 to customize the length of the headset structure until an appropriate amount of force is distributed against the end-user's head along the inside of the temples 304, 306. As the length increases as the distal portions 308, 310 get farther from the bridge 302, the temple stop point may become more acute according to this example implementation, thus propagating more force along the inside of the walls of the temples 304, 306 that make contact with the user's head.

One way in which the end-user may extend and retract the portions 308, 310 is by scrolling a mechanical wheel or dial that forms part of a respective mechanism 314, 316, such as a left wheel 332 for the left temple 304 and a right wheel 334 for the right temple 306. The right wheel 334 is shown close-up in the perspective views of FIGS. 6-8, with the temple 306 positioning for FIG. 6 corresponding to that shown in FIG. 3, the positioning for FIG. 7 corresponding to that shown in FIG. 4, and the positioning for FIG. 8 corresponding to that shown in FIG. 5. Note that the wheels 332, 334 may be located on the bridge 302 as shown, but in other examples may be respectively located on the left and right temples 304, 306 instead. Also note that in some examples, the wheels 332, 334 (and even other left and right extension/retraction mechanisms to be described below in reference to FIGS. 9-12) may instead be embodied in a single wheel or other mechanism located on one side of the bridge or the other, and the headset 300 may use mechanical linkage to jointly control both temples' positioning with respect to the bridge using the single wheel or other element.

Figure 6:
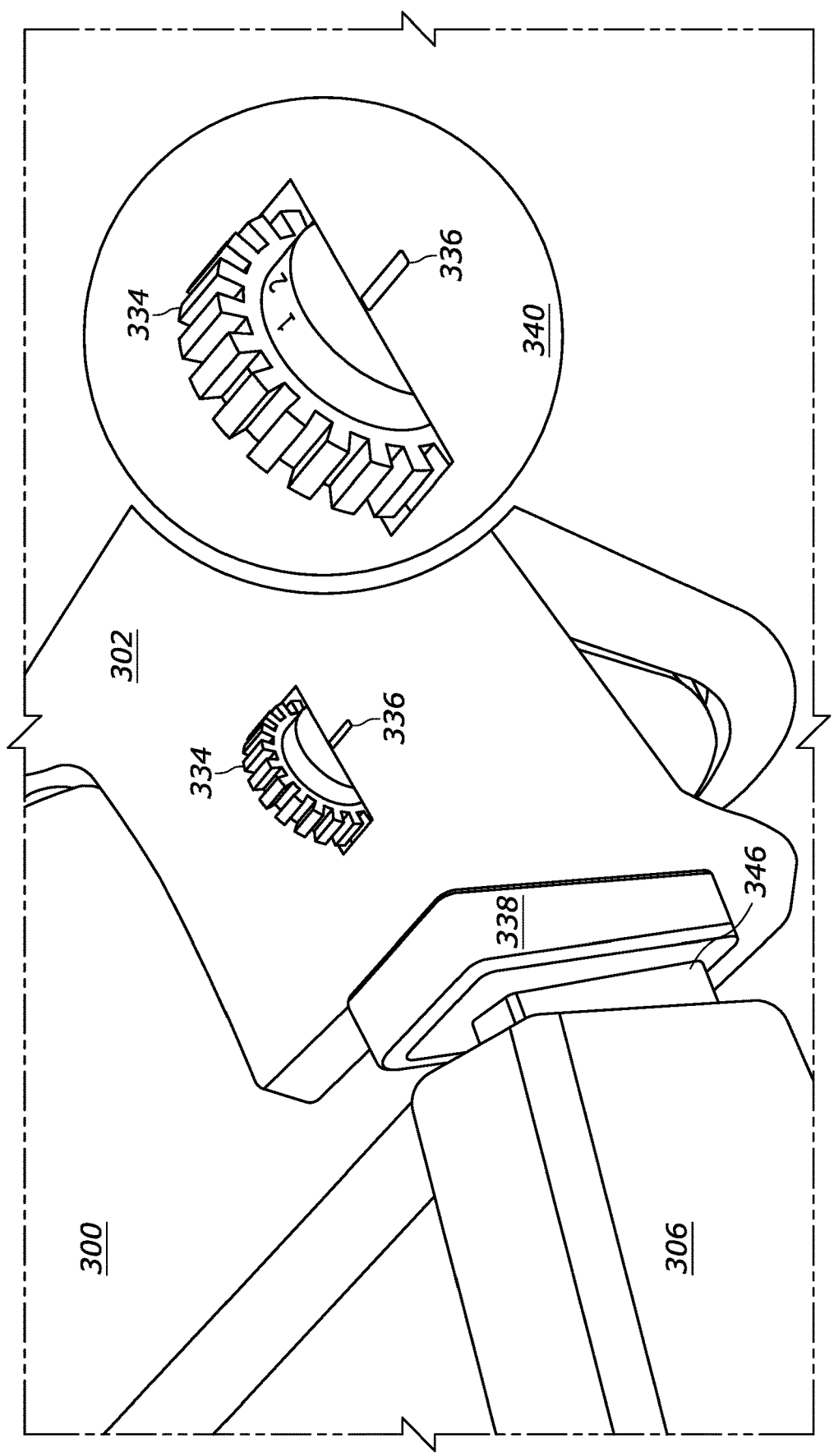
FIGS. 6-8 show perspective views of part of the headset where the headset's bridge and a right-side temple connect consistent with present principles.

In any case, further note with respect to FIG. 6 that it shows the temple 306 in its most-retracted preset position of "1" per the label shown on the wheel 334 as matched by the user to a current extension length indicator 336, which is best seen in the exploded view bubble 340. Then as best shown in the exploded view bubble 342 of FIG. 7, the temple 306 is now in a more extended preset position of "2" (to establish the angle 326) as also labeled on the wheel 336 upon the user turning the wheel counter-clockwise relative to the perspective shown from "1" to "2" with a finger or other body part. Finally, as shown in the exploded view bubble 344 of FIG. 8, the temple 306 is now in an even more extended preset position of "3" (to establish the angle 330) as also labeled on the wheel 336 upon the user turning the wheel counter-clockwise again from "2" to "3".

Figure 7:
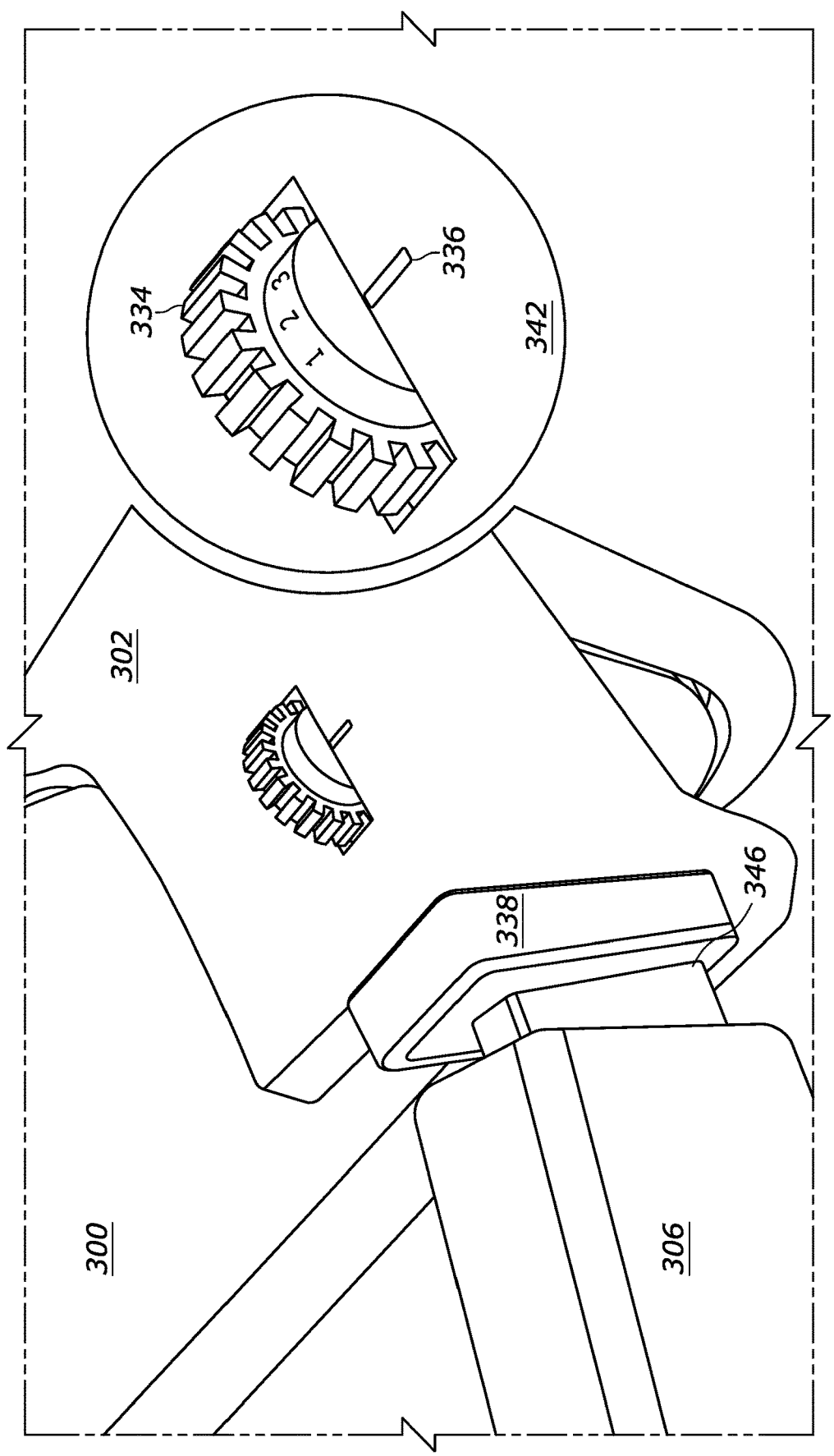
Figure 8:
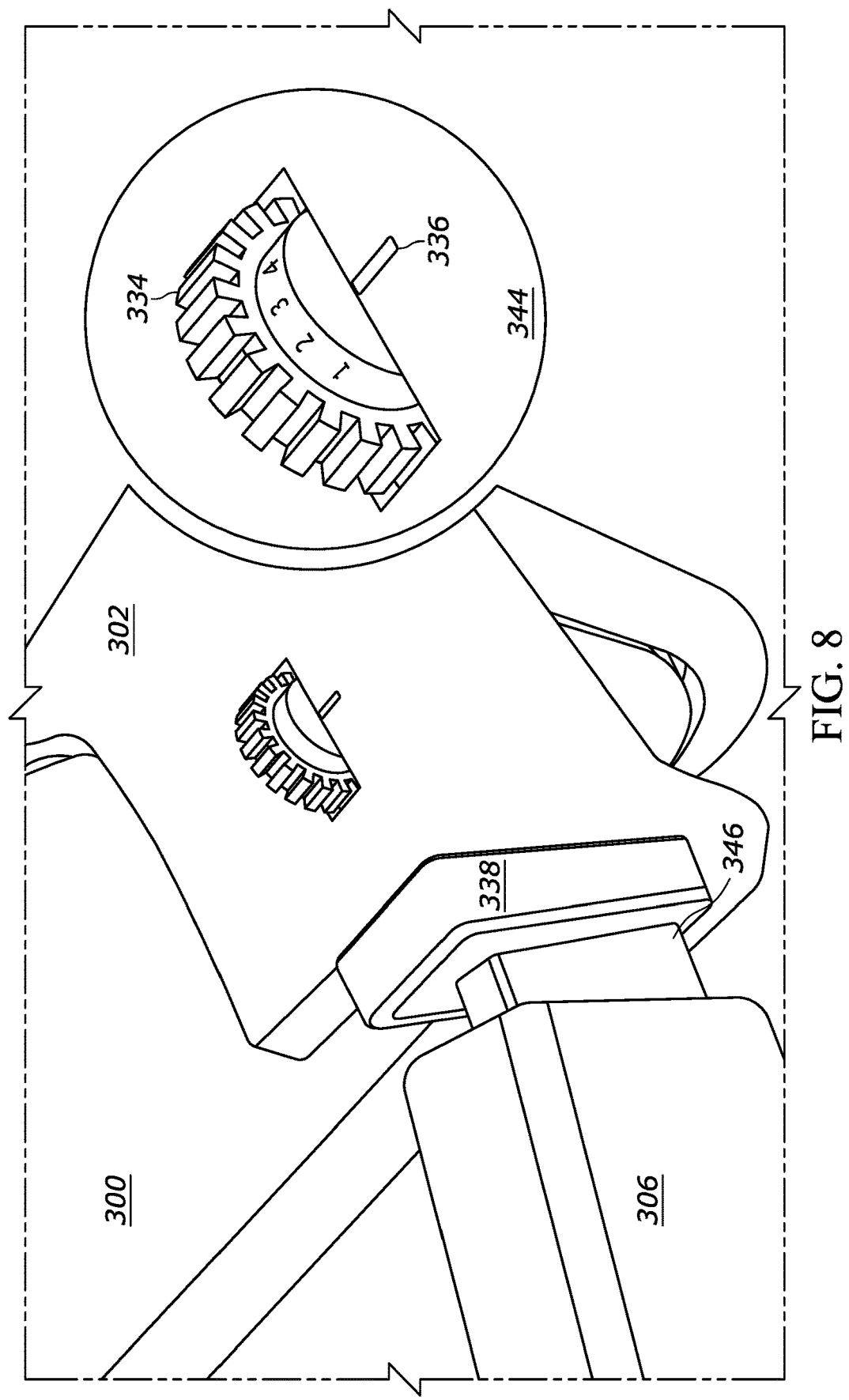

The perspective views of FIGS. 6-8 also show other portions of the mechanism 316 beyond the wheel 334, including an outer box structure 338 that is mounted or anchored to the bridge 302. The outer box structure 338 may house at least one inner adjustable core structure that is nested within the structure 338 and/or nested within other portions of the housing of the headset 300. The inner adjustable core structure may include a nested extension bar 346 that itself extends or retracts to configure the temple 306 in the various configurations shown in FIGS. 3-8. Thus, the wheel 336 may be turned clockwise and counterclockwise between the preset positions of "1", "2", "3", "4", and so on to extend and retract the temple 306 from the bridge 302 via the extension bar 346. Note that the wheel 334 and similar corresponding structure for the left-side connection of the bridge 302 to the temple 304 may be similarly configured for that side. Also note that the extension bar 346 may come straight out from the bridge 302 or may be configured to protrude from the bridge obliquely at the respective angles 322, 326, 330.

Figure 9:
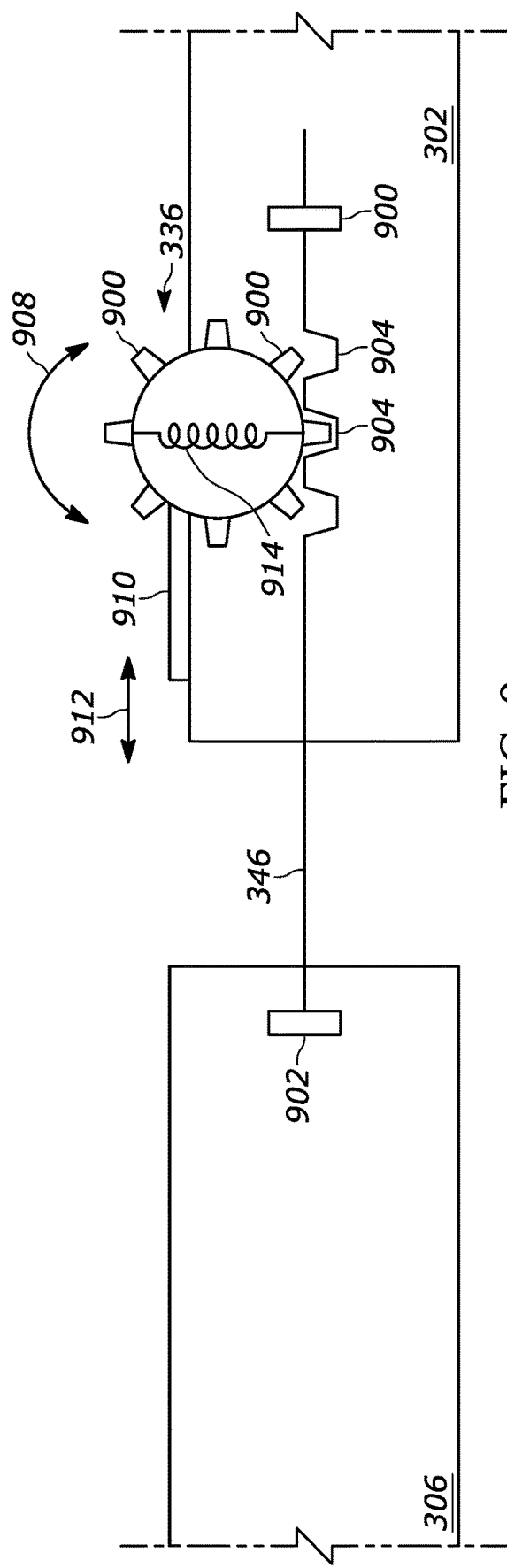
FIGS. 9, 10, and 12 show side cross section views of various example mechanisms that may be used to extend and retract the headset's right temple from the headset's bridge consistent with present principles.

Various example inner adjustable core structures that may incorporate the extension bar 346 are shown in FIGS. 9-12. Beginning first with the side cross-sectional view of FIG. 9, it shows an example mechanism that employs the wheel 336 described above. The mechanism includes the wheel 336 itself, which has teeth 900 as shown that engage with preset indents in a track 904 on the extension bar 346. As also shown in FIG. 9, the extension bar 346 may be fixed/anchored to the temple 306 at one end with an anchor 902, and also have an anchor 906 fixed within the bridge 302 at the other end. However, note that the anchor 906 may have a hole through which lengthwise segments of the extension bar 346 can slide under control of the wheel 336 to extend and retract the temple 306 with respect to the bridge 302. Circular arrows 908 thus indicate the bi-directional manner in which the wheel 336 may be rotated to move different gear teeth in and out of the track 904 to perform this extension and retraction.

Still in reference to FIG. 9, further note that the implementation shown may include one or more locks/locking mechanisms that selectively lock and unlock the arrangement of the right temple 306 with respect to the bridge 302. For example, the locking mechanism may include a slider bar 910 that slides in and out of the teeth 900, toward and away from the temple 306 according to the arrows 912 shown, so that the wheel 336 cannot turn while the slider bar 910 is positioned in between two of the teeth 900.

Additionally, or alternatively, a quick-release spring-loaded locking mechanism 914 may be included as part of the wheel 336 itself to lock the wheel 336 in place along the track 904. Thus, based on one press of the wheel 336 toward the inside of the bridge 302 toward the track 904 itself, the temple 306 extension/retraction mechanism may be locked. Then based on another press of the wheel 336 toward the inside the bridge 302 toward the track 904 itself, the temple 306 extension/retraction mechanism may be unlocked.

Again, note that while structure for the right side of the headset 300 is shown in FIG. 9, similar structure may be implemented for the left side of the headset 300 as well in order to similarly move the left temple 304 with respect to the bridge 302 and lock the left temple 304 in place. The same can be said for implementing the right-side structures of FIGS. 10-12 as described below for the left side temple 304. Also note that in some implementations the respective components themselves may be reversed between the bridge and temple, such as the wheel 336 and track 904 being located in the temple 306 and the anchor 902 being located in the bridge 302.

Figure 10:
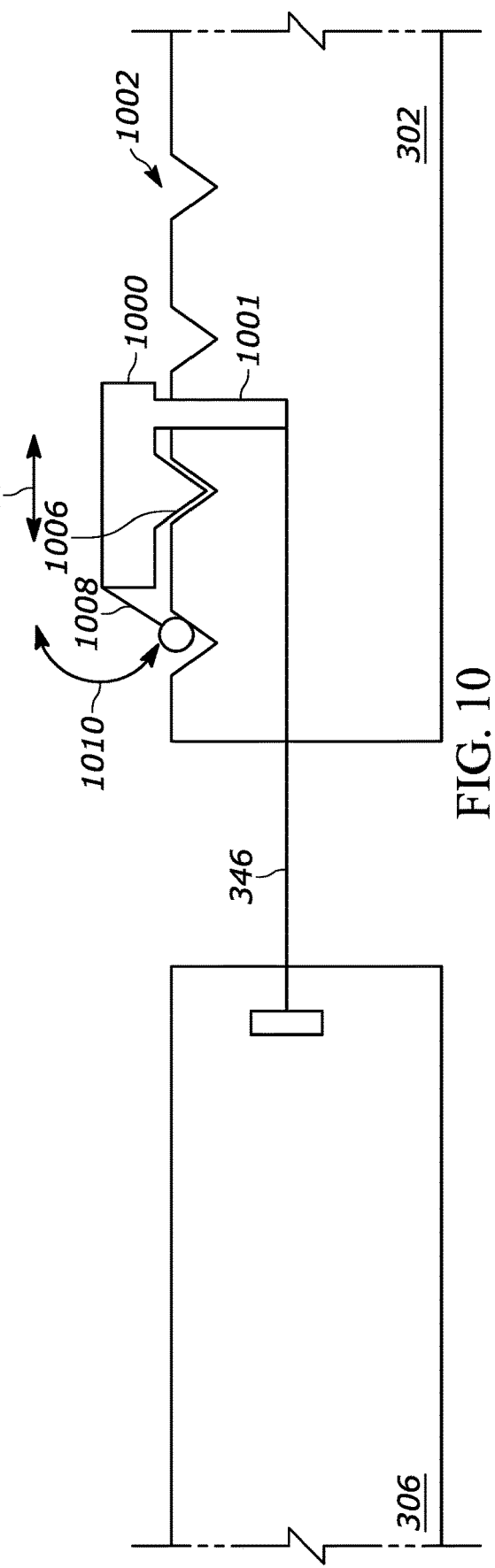

In any case, refer now to FIG. 10, which shows another side cross-section view of an example right-side mechanism for moving the right temple 306 with respect to the bridge 302 but using a slider 1000 rather than the wheel 336. The slider 1000 may fixedly anchor within the bridge 302 to one end of the extension bar 346 using a first tooth 1001. The tooth 1001 may extend through a first track 1100 in the top of the bridge 302 that is best shown in the top plan partial view of FIG. 11 in order to engage the extension bar 346. The other end of the extension bar 346 may be fixedly anchored within the temple 306, as shown in FIG. 10. An end-user may therefore slide the sider 1000 according to the arrows 1004 back and forth along both the first track 1100 and a second track 1002 with which the slider 1000 is also engaged (the track 1002 also being shown in FIG. 11).

Figure 11:
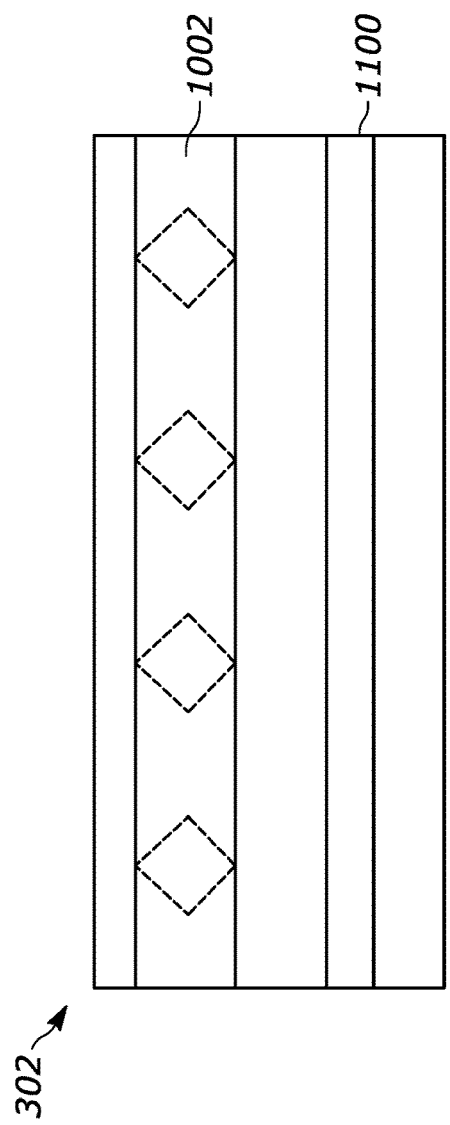
FIG. 11 shows a top plan view of example slider tracks that may be used according to one of the example mechanisms to extend and retract the headset's right temple from the headset's bridge consistent with present principles.

With reference to FIG. 10 specifically, the second track 1002 may have preset indents as shown, with an interference fit being used to keep a second tooth 1006 of the slider 1000 within one of the preset indents of the track 1002 once slid by the end-user. Thus, the teeth 1001 and 1006 may be laterally spaced from each other on the slider 1000 relative to the sliding direction of the slider 1000, on an underside of the slider 1000. FIG. 11 shows the indents as diamonds within the track 1002, and it may be further appreciated from FIG. 11 that the tracks 1002 and 1100 run parallel to each other along the top surface of the bridge 302 in a direction toward and away from the temple 306 itself (e.g., in a direction perpendicular to the axis 318 in the Z dimension) to accommodate the laterally-spaced teeth 1001 and 1006.

Additionally, as also shown in FIG. 10, if desired the slider 1000 may be locked in place at one of the preset indents in the track 1002 using a rotatable lock 1008 that swings up and down radially according to arrows 1010 to allow the slider 1000 to be slid while the lock 1008 is up and to lock the slider 1000 in place along the track 1002 while the lock 1008 is down (as shown in FIG. 10). As also shown, in some examples the end of the lock 1008 that enters the indents in the track 1002 may have a rubber or rubber-coated spherical-shaped element on the end to create additional interference and friction within the indent to lock the slider 1000 in place.

Figure 12:
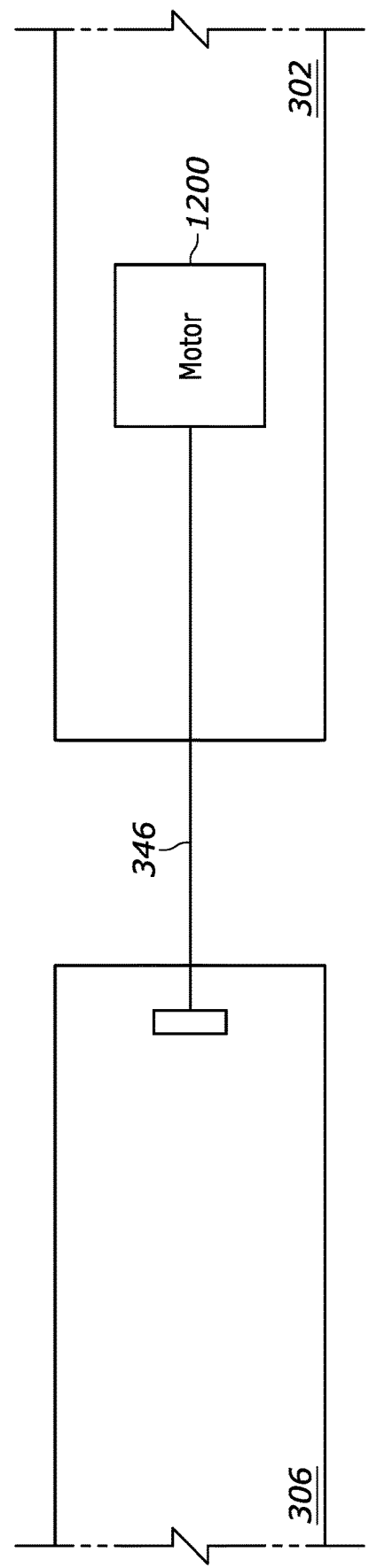

FIG. 12 shows yet another side cross-section view of an example mechanism for moving the temple 306 with respect to the bridge 302. In this example, the extension bar 346 is fixedly anchored at one end to the temple 306. The extension bar 346 also connects at its other end to a motor/gear box combination 1200 that includes a motor for rotating gears within the gear box of the combination 1200 to slidably extend and retract the extension bar 346 within the bridge 302 to thus extend and retract the temple 306 from the bridge 302. In some examples, the temple 306 may be extended and retracted in preset increments using the combination 1200.

It may therefore be appreciated that, in contrast to the example mechanical implementations shown in FIGS. 3-11, the implementation shown in FIG. 12 may be electronic in that a processor within the headset 300 may control the motor/gear box combination 1200 to move temple 306 with respect to the bridge 302 (with power from a battery within the headset being used to power the motor itself). However, it is to be further understood that the implementations shown in FIGS. 3-11 may have a similar motor/gear box combo integrated into them as well in order to electronically move the components of those implementations electronically under control of a motor (e.g., move the wheel 336 along the track 904) in addition to or in lieu of the user doing so mechanically.

But regardless of which implementation might use a motor/gear box combination, it is to be further understood consistent with present principles that the headset may autonomously actuate the motor/gear box combination to adjust the pressure exerted by various parts of the headset 300 on an end-user's head. Pressure at these pressure points may be detected using pressure sensors such as the sensors 220 described above. The headset's processor may then execute the logic of FIG. 13 to adjust the pressure exerted at the pressure points.

Figure 13:
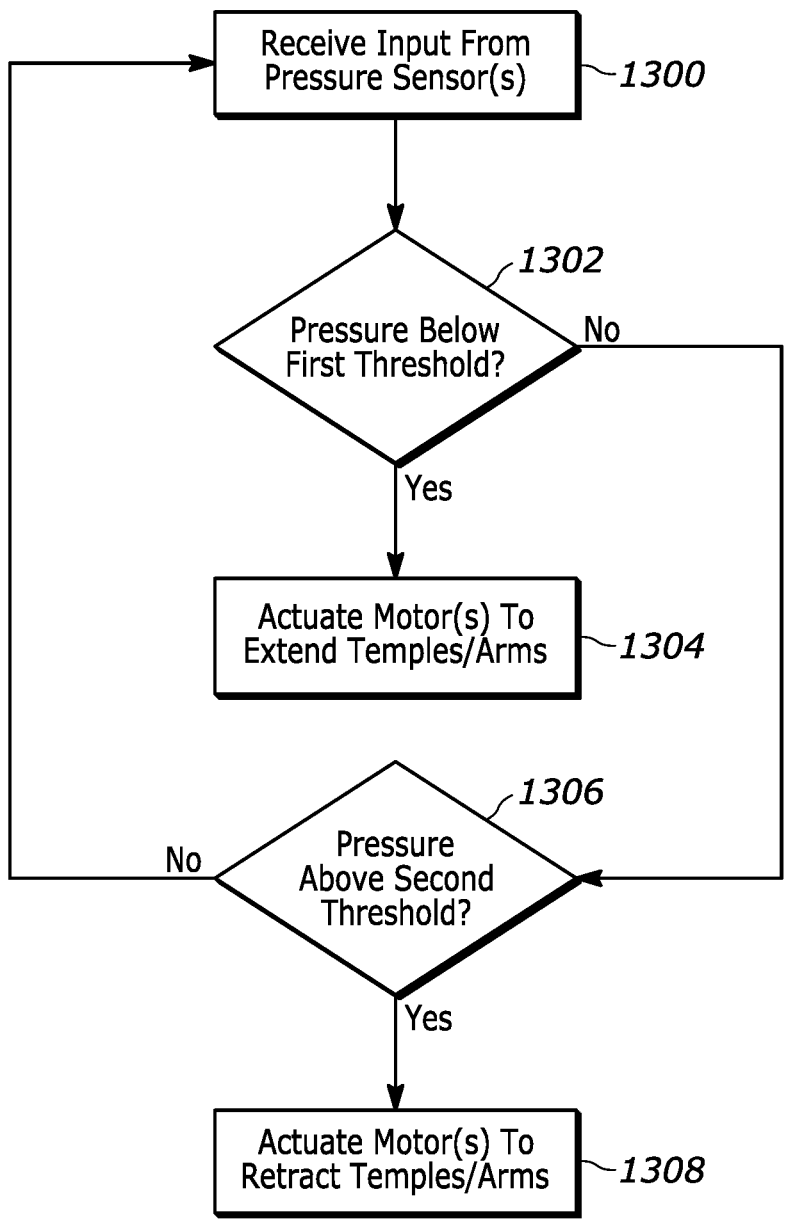
FIG. 13 illustrates example logic in example flow chart format that may be executed by the headset consistent with present principles.

Accordingly, reference is now made to FIG. 13, which shows example logic that may be executed by a headset consistent with present principles. Note that while the logic of FIG. 3 is shown in flow chart format, state logic or other suitable logic may also be used.

Beginning at block 1300, the headset may receive input from one or more of the pressure sensors implicating pressure along a right temple and/or left temple of the headset (or in some examples, implicating pressure on the head jointly exerted by both temples). The logic may then move to block 1302 where the headset may determine whether, based on the input from the pressure sensor(s), pressure at one or more pressure points is below a first threshold for too little pressure. An affirmative determination may cause the logic to proceed to block 1304 where the headset may actuate the respective motor on the respective side of the headset exerting the pressure below the first threshold (or in some examples, actuate both motors) to extend the respective temple of the headset to increase pressure of the respective temple along the respective pressure point.

However, a negative determination at diamond 1302 may instead cause the logic to proceed directly to decision diamond 1306 where the headset may determine whether, based on the input from the pressure sensor(s), pressure at one or more pressure points is above a second threshold for too much pressure. An affirmative determination may cause the logic to proceed to block 1308 where the headset may actuate the respective motor on the respective side of the headset exerting the pressure above the second threshold (or in some examples, actuate both motors) to retract the respective temple of the headset to decrease pressure of the respective temple along the respective pressure point. The logic may then revert back to block 1300 to proceed therefrom, with it being further noted that if a negative determination is made at diamond 1306 then the logic may also proceed back to block 1300 but without executing block 1308.

Still in reference to FIG. 13, note that the first and second pressure thresholds described above may be empirically determined by the developer or manufacturer of the headset based on reported acceptable levels of pressure. For example, acceptable levels may be determined by testing different amounts of pressure on a test set of users of different head widths and ear positions, where the users indicate acceptable minimum low pressure comfort levels and maximum high pressure comfort levels. Additionally, or alternatively, mechanical adjustments performed by users in the field (using one or more of the implementations above) once the headset has been sold may also be reported by their headsets over the Internet to infer acceptable minimum low pressure comfort levels and maximum high pressure comfort levels.

Figure 14:
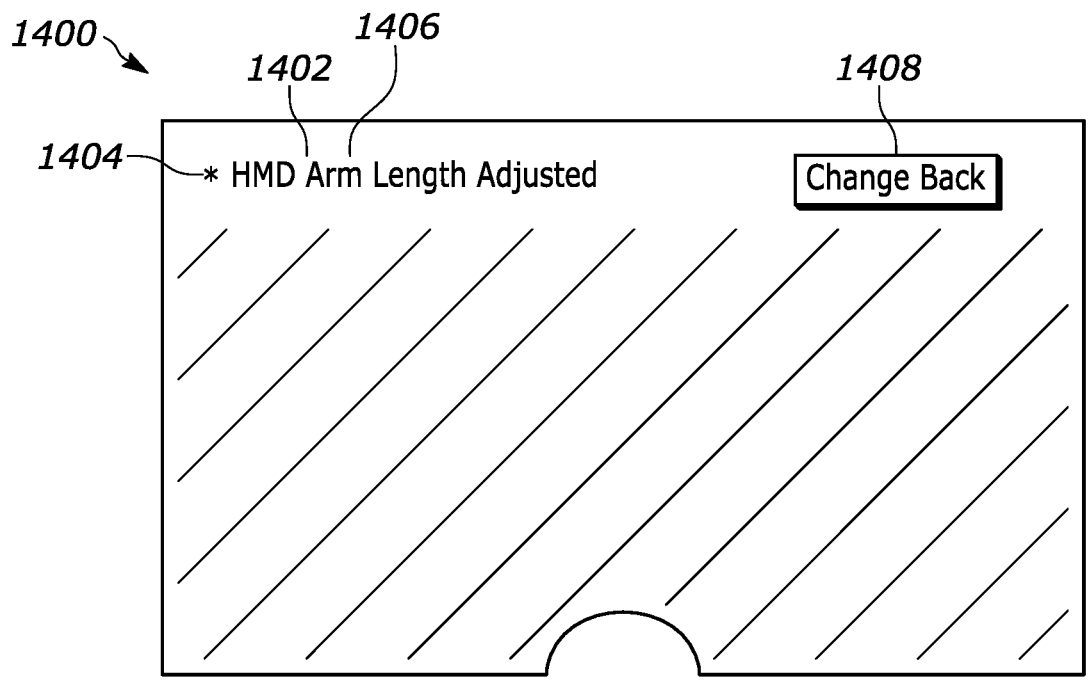
FIG. 14 shows an example visual notification that may be presented on the headset's display to notify the user of a change in the positioning of one or more of the headset's temples with respect to its bridge consistent with present principles.

Now in reference to FIG. 14, it shows an example notification that may be presented using the transparent electronic display(s) within the headset's lenses responsive to the headset executing either of blocks 1304 and 1308 of FIG. 13. In this example, the notification is presented as a graphical user interface (GUI) 1400, but note that the notification may also take the form of an audible one that is presented audibly using one or more speakers connected to the headset to read aloud the text forming part of the visual notification 1402 shown on the GUI 1400.

As shown in FIG. 14, the visual notification 1402 includes a non-text star icon 1404 to get the end user's attention, along with text 1406 indicating that the headset/HMD's arm/temple length has been adjusted. In some examples, the text 1406 may specifically indicate whether the temple(s) were extended or retracted. However, if the end user wishes to go back to the previous temple-to-bridge configuration from prior to the extension or retraction, the user may select the selector 1408 to command the headset to actuate its motor(s) to revert back to the previous configuration.

Figure 15:
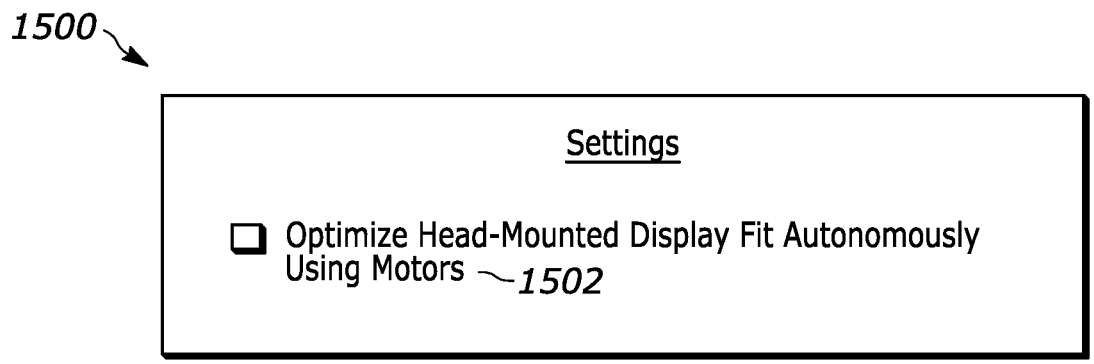
FIG. 15 shows an example graphical user interface (GUI) that may be presented on a display on or in communication with the headset to configure one or more settings of the headset consistent with present principles.

Before describing FIG. 15, note with respect to FIG. 14 that a similar notification may be presented even in implementations where the headset does not include one or more motors that may be controlled using the logic of FIG. 13. For example, based on the user mechanically changing the positioning of the temples with respect to the bridge, the text 1406 may be presented.

Continuing the detailed description in reference to FIG. 15, it shows another example GUI 1500 that may be presented on the display of the headset or a connected device such as a smartphone or laptop computer. The GUI 1500 may be reached by navigating a settings menu for the headset, for example.

As shown, the GUI 1500 may include at least a first option 1502 that may be selectable by directing touch or cursor input to the adjacent check box in order to set or enable the headset to, in the future, undertake the logic of FIG. 13. Other options may be presented as well, such as an option for the end user to specify a desired insufficient pressure level to use for the first threshold of FIG. 13 and a desired excess pressure level to use for the second threshold of FIG. 13.

It may now be appreciated that present principles provide for an improved user interface that increases the functionality and ease of use of the devices disclosed herein. Disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
   a bridge comprising one or more lenses;
   an elongated left temple coupled to a left portion of the bridge; and
   an elongated right temple coupled to a right portion of the bridge;
   one or more pressure sensors; and
   one or more processors;
   wherein at least part of the headset comprises:
   at least one adjustable mechanism that is manipulable to arrange the structure of the left and right temples toward and away from the bridge; and
   wherein the headset comprises storage with instructions executable by the one or more processors to:
   receive input from the one or more pressure sensors;
   determine whether pressure indicated by the input is one or more of: below a first pressure threshold, above a second pressure threshold; wherein the second pressure threshold is higher than the first pressure threshold;
   responsive to a determination that pressure indicated by the input is below the first pressure threshold, actuate the at least one adjustable mechanism to increase pressure between a user's head and one or more of: the right temple, the left temple; and
   responsive to a determination that pressure indicated by the input is above the second pressure threshold, actuate the at least one adjustable mechanism to decrease pressure between the user's head and one or more of: the right temple, the left temple.

2. The headset of claim 1, comprising:
   a left adjustable mechanism that is manipulable to arrange the structure of the left temple toward and away from the left portion of the bridge; and
   a right adjustable mechanism that is manipulable to arrange the structure of the right temple toward and away from the right portion of the bridge.

3. The headset of claim 2, comprising:
   a left locking mechanism that selectively locks and unlocks the arrangement of the left temple with respect to the left portion of the bridge;
   a right locking mechanism that selectively locks and unlocks the arrangement of the right temple with respect to the right portion of the bridge.

4. The headset of claim 1, comprising a housing, wherein the at least one adjustable mechanism comprises at least one adjustable core structure that is nested within the housing, and wherein the at least one adjustable mechanism comprises at least one slider extending out of the housing and slidable by the user to extend and retract at least part of the left and right temples with respect to the bridge using the at least one core structure.

5. The headset of claim 1, comprising a housing, wherein the at least one adjustable mechanism comprises at least one adjustable core structure that is nested within the housing, and wherein the at least one adjustable mechanism comprises at least one wheel extending out of the housing and manipulable by the user to extend and retract at least part of the left and right temples with respect to the bridge using the at least one core structure.

6. The headset of claim 5, wherein the at least one wheel is located on the bridge.

7. The headset of claim 5, wherein the at least one wheel is located on at least one of the temples.

8. The headset of claim 1, wherein the headset comprises left and right pressure sensors respectively located on the left and right temples.

9. The headset of claim 1, wherein the one or more lenses comprise one or more electronic displays.

10. A method, comprising:
    providing a bridge for a headset, the bridge comprising one or more lenses;
    providing a first arm coupled to a first portion of the bridge;
    providing a second arm coupled to a second portion of the bridge;

providing at least one adjustable mechanism that is manipulable to extend and retract distal portions of the first and second arms from the bridge;
providing one or more pressure sensors on the headset;
providing one or more processors on the headset; and
providing storage on the headset, the storage comprising instructions executable by the one or more processors to:
receive input from the one or more pressure sensors;
determine whether pressure indicated by the input is one or more of: below a first pressure threshold, above a second pressure threshold; wherein the second pressure threshold is higher than the first pressure threshold;
responsive to a determination that pressure indicated by the input is below the first pressure threshold, actuate the at least one adjustable mechanism to increase pressure between a user's head and one or more of: the right arm, the left arm; and
responsive to a determination that pressure indicated by the input is above the second pressure threshold, actuate the at least one adjustable mechanism to decrease pressure between the user's head and one or more of: the right arm, the left arm.

11. The method of claim 10, comprising:
providing a locking mechanism that selectively locks and unlocks the positioning of the distal portions of the first and second arms with respect to the bridge.

12. The method of claim 10, wherein the at least one adjustable mechanism comprises at least one adjustable inner structure and at least one element that is manipulable to extend and retract the distal portions with respect to the bridge using the inner structure.

13. The method of claim 12, wherein the at least one element is located on the bridge.

14. An assembly, comprising:
a bridge with one or more electronic lenses;
a first arm coupled to a first portion of the bridge;
a second arm coupled to a second portion of the bridge;
at least one mechanism that is controllable to extend and retract distal portions of the first and second arms from the bridge, the at least one mechanism comprising at least one track for sliding the first and second arms with respect to the bridge to extend and retract the distal portions from the bridge, the at least one mechanism comprising at least one element that is controllable to move the first and second arms with respect to the bridge along the at least one track;
one or more pressure sensors;
one or more processors; and
storage comprising instructions executable by the one or more processors to:
receive input from the one or more pressure sensors;
determine whether pressure indicated by the input is one or more of: below a first pressure threshold, above a second pressure threshold; wherein the second pressure threshold is higher than the first pressure threshold;
responsive to a determination that pressure indicated by the input is below the first pressure threshold, actuate the at least one mechanism to increase pressure between a user's head and one or more of: the right arm, the left arm; and
responsive to a determination that pressure indicated by the input is above the second pressure threshold, actuate the at least one mechanism to decrease pressure between the user's head and one or more of: the right arm, the left arm.

15. The assembly of claim 14, comprising:
at least one lock to lock the first and second arms at particular locations with respect to the bridge.

16. The assembly of claim 14, comprising:
a first mechanism that is controllable to extend and retract the distal portion of the first arm from the first portion of the bridge, the first mechanism comprising a first track for sliding the first arm with respect to the bridge to extend and retract the distal portion of the first arm from the first portion of the bridge, the first mechanism comprising a first element that is controllable to move the first arm with respect to the bridge along the first track; and
a second mechanism that is controllable to extend and retract the distal portion of the second arm from the second portion of the bridge, the second mechanism comprising a second track for sliding the second arm with respect to the bridge to extend and retract the distal portion of the second arm from the second portion of the bridge, the second mechanism comprising a second element that is controllable to move the second arm with respect to the bridge along the second track.

17. The assembly of claim 16, comprising:
a first lock to lock the first arm at a particular preset location with respect to the bridge; and
a second lock to lock the second arm at a particular preset location with respect to the bridge.

18. The assembly of claim 14, wherein the assembly is established by electronic glasses.

19. The assembly of claim 14, wherein the at least one element is controllable to move the first and second arms along the at least one track in preset increments.

20. The assembly of claim 14, wherein the at least one mechanism is controllable to extend and retract distal portions of the first and second arms obliquely away from a surface of the bridge from which the first and second arms extend.

* * * * *